United States Patent Office 2,999,090
Patented Sept. 5, 1961

2,999,090
PREPARATION OF OXIDIZED HYDROXY-ALKYL STARCH
Kenneth C. Hobbs, Clarendon Hills, Ill., assignor to Corn Products Company, a corporation of Delaware
No Drawing. Filed May 10, 1957, Ser. No. 658,242
2 Claims. (Cl. 260—233.3)

This invention relates to new starch derivatives and to a process for making the same. More particularly it relates to a process for the hydroxyalkylation and oxidation of starch and the products produced thereby.

It is known that hydroxyalkylation of starches improves a number of their paste properties over raw or untreated starch. For example, pastes of hydroxylalkyl starches have better clarity, better film forming properties, better sizing values and considerably less set back than pastes from untreated starch. The improvement in these various properties in the hydroxyalkyl starches increases with the degree of hydroxyalkylation. However, as the degree of hydroxyalkylation increases so does the cost thereof. Furthermore, as the D.S. level increases, the swelling and gelatinization temperatures decrease and it is impractical to hydroxyalkylate at the low temperatures required to prevent swelling or gelatinization of the starch ether granules. And the starch ethers become more soluble as D.S. increases and this problem added to the one aforementioned makes recovery of the starch ether from aqueous systems increasingly difficult. If lime is used as a catalyst in the hydroxyalkylation, D.S. levels of hydroxyalkylation up to 0.15 can be obtained without gelatinizing the starch but the resultant starch ethers when pasted have an off-color and frequently have lost their clarity due to the impurities in the lime. And such starch pastes still have limitations in respect of stability to shearing, film forming properties, level of viscosity, etc.

An object is to improve the stability of pastes of hydroxyl starches particularly in respect of resistance to shearing stresses. Another object is to improve the clarity and color of pastes of hydroxyalkyl starches. Another object is to improve the film forming properties of such pastes. A further object is to provide a procedure whereby unswollen hydroxyalkyl starch may be treated without disrupting the granules to give products which form pastes of low viscosity. Another object is to provide a means of readily varying the paste viscosity of pastes made from hydroxyalkyl starch. Other objects will appear hereinafter.

I have found that I can accomplish the aforementioned objects by hydroxyalkylating starch with lime as catalyst under non-gelatinizing conditions, removing impurities at a low pH and then oxidizing the hydroxyalkyl starch with an oxidizing agent which releases chlorine under the conditions of oxidation at an oxidation-reduction potential of at least about 700 millivolts and at a pH of at least 8.0. If during the oxidation, the pH is maintained at about 11.1 and the amount of chlorine (free chlorine) is in the range of about 0.03 to about 0.5 percent, based on the weight of the hydroxyalkyl starch, the resistance of the resultant product to disintegration to shear stresses passes through a maximum. When the pH is about 8.5 a large proportion of carbonyl groups are formed and when it is about 10.5 a large proportion of carboxyl groups are formed.

The oxidation treatment is applicable to all hydroxyalkyl starches and it is advantageous to apply the oxidation treatment to the hydroxyalkyl starch immediately after it has been prepared and washed at low pH so as to eliminate an unnecessary drying step.

As already mentioned, high D.S. levels of hydroxyalkylation without swelling starch granules can be attained using lime as catalyst in the reaction. However, commercial grades of lime usually contain from 8 to 10 percent of insoluble impurities which impart an unattractive gray cast to starch products when employed in their manufacture. In addition, pastes prepared from such products have poor color and frequently do not possess good clarity. The impurities aforementioned can be removed readily from the hydroxyalkyl starch by adjusting the pH of the slurry containing the same after the hydroxyalkylation to about 2.0 and then filtering the hydroxyalkyl starch and washing it with water or by displacement of the liquid phase of the slurry at a pH of about 2.0.

The invention will be further illustrated by the following examples which are intended to be typical and informative only and in no way limiting the invention.

*Example 1*

This example illustrates oxidation of an acid washed hydroxyethyl starch. Grain sorghum starch (100 parts) in a 22° Bé. aqueous slurry was treated at 104° F. with 2.0 parts of hydrated lime and 2.5 parts of ethylene oxide. After a 10-hour reaction period, the mixture was adjusted to pH 7.0 with hydrochloric acid and the product was filtered, washed and dried. The resultant product contained 0.05 hydroxyethyl groups per glucose residue and had a 10 g.-100 ml. Scott viscosity of 70 seconds. A slurry containing 538 g. of this product in about 750 ml. of water was acidified with dilute hydrochloric acid to pH 2.0. The product was filtered and washed, first with 500 ml. of water at pH 2.0 and then with 500 ml. of distilled water. The product was reslurried and the slurry was adjusted to pH 10.7 with 1.0 N sodium hydroxide solution. To this slurry at 40° C. was added 281.5 ml. of sodium hypochlorite solution which was 0.533 molar with respect to sodium hypochlorite and 0.009 molar with respect to free sodium hydroxide. The hypochlorite was added over a period of 50 minutes at a constant rate of 1 millimole of NaOCl per glucose residue per minute. Simultaneously, the slurry was maintained at pH 10.7 by addition of 1.0 N sodium hydroxide solution. After 260 minutes, when the oxidation was complete, the slurry was adjusted to pH 8.0 and the product was filtered, washed and dried. This finished product was exceptionally white and very attractive in the dry granular state. It had a 28.35 g.-100 ml. Scott viscosity of 80 seconds and produced a colorless and almost perfectly clear paste having a concentration of 8 percent. Microscopic examination of the paste showed the presence of only a small amount of very minute fragments from the original starch granules. On cooling to room temperature the paste showed no signs of retrogradation. After standing for several weeks in a sealed bottle, the paste remained clear, viscous and free-flowing. By way of contrast, a 0.05 D.S. hydroxyethyl starch which was degraded to a comparable paste viscosity level by acid modification produced a cloudy paste which had a distinct yellow cast and which set to a rather firm gel on standing at room temperature overnight. Even acid modified 0.1 D.S. hydroxyethyl products do not show paste stability as good as that of the oxidized 0.05 D.S. product described above. Films prepared from this oxidized hydroxyethyl starch were exceptionally clear, hard and tenacious.

*Example 2*

To a slurry containing 648 g. of corn starch, 13.2 g. of hydrated lime, 65 g. of methanol and 900 g. of water at 40° C. was added 38.8 g. of ethylene oxide. After 17 hours of reaction, the slurry was cooled to 30° C., adjusted to pH 2.0 with dilute hydrochloric acid and the product was filtered and washed with 1000 ml. of water. The product was reslurried in water to a volume of 1800 ml. and one-fourth was isolated at pH 7.0, filtered, washed and dried. The remainder of the slurry was adjusted to pH 10.7 with 1.0 N sodium hydroxide solution and was treated at 30° C. with 510 ml. of 0.400 molar sodium hypochlorite solution which was added at the rate of 1 millimole per glucose residue per minute. Throughout the oxidation period the pH level was maintained at pH 10.7 by addition of 1.0 N sodium hydroxide. After a total of 6 hours the slurry was adjusted to pH 8.0 with dilute hydrochloric acid and the product was filtered, washed and dried. The resultant product contained 0.013 carboxyl groups and 0.14 hydroxyethyl groups per glucose residue. It had a 50 g.-100 ml. Scott viscosity of 73 seconds and produced a very clear, free-flowing paste. This product had an initial pasting temperature of 47° C. It is estimated that acid modification of a 0.14 D.S. hydroxyethyl starch to a similar viscosity level would require 16 to 20 hours at 30° C. and approximately 1.5 mole of hydrochloric acid per glucose residue.

*Example 3*

I have discovered that in the initial stages of oxidation at pH 8.0 about 5 or more carbonyl groups are produced per carboxyl group formed. This ratio varies inversely with the pH during oxidation. When starch is oxidized at about pH 10.5 or higher substantially no carbonyl groups can be found in the reaction product. An example demonstrating oxidation of hydroxyethyl starch to a product rich in carbonyl groups follows:

A slurry containing 162 g. of 0.05 D.S. hydroxyethyl starch made as previously described was acidified to pH 2.0 and the product was filtered, washed with 250 ml. of water and reslurried to a total slurry weight of 400 grams. The slurry was adjusted to pH 8.0 with 1.0 N sodium hydroxide and then 0.621 molar sodium hypochlorite solution was added at a rate sufficient to maintain an oxidation-reduction potential of +800 millivolts. During oxidation the slurry was maintained at 40° C. and at pH 8.0.

Data showing the course of oxidation follows:

| Time (Minutes) | NaOCl Added (Millimole) | Groups Formed Per 1,000 Glucose Residues | |
|---|---|---|---|
| | | Carboxyl | Carbonyl |
| 2.0 | 5.3 | 0 | 5.3 |
| 25.0 | 10.0 | 0.1 | 9.8 |
| 50.0 | 14.0 | 0.6 | 13.1 |
| 75.0 | 18.5 | 1.2 | 16.7 |
| 100.0 | 22.2 | 2.0 | 19.2 |
| 125.0 | 26.6 | 3.0 | 22.1 |
| 150.0 | 33.0 | 4.8 | 25.8 |
| 175.0 | 49.0 | 8.4 | 36.4 |
| 200.0 | 68.0 | 17.0 | 42.5 |

Although this particular reaction was conducted for 200 minutes, it could have been discontinued at any earlier stage by addition of a small amount of reducing agent such as sodium bisulfite and the carbonyl groups could have been preserved by decreasing the slurry pH to a level in the range of about 4.5 to 6.5. In addition to modifying the physical characteristics of starch pastes, the formation of various proportions of carboxyl and carbonyl groups makes possible production of new types of starch products through reactions involving these functional groups.

*Example 4*

Various amounts of chlorine were added to slurries containing 160 g. of 0.05 D.S. hydroxyethyl starch, 4.0 g. of hydrated lime and 250 ml. of water. After 30 minutes of oxidation, each reaction mixture was acidified with dilute hydrochloric acid to pH 3.0 and the product was filtered and washed first with dilute acid and then with distilled water. The pH of each product was raised by washing the cake with a dilute pH 6.5 sodium phosphate buffer solution (concentration=0.85 percent) and finally with distilled water.

The paste characteristics of the isolated products were determined using a Brabender Amylograph-Viscograph. In each test with this instrument the rotating cup was charged with 500 ml. of slurry containing 35 g. of product. The mixture was heated from 50 to 95° C. over a 30-minute period, held at 95° C. for 60 minutes, cooled to 50° C. over a 30-minute period and then held at 50° C. for 60 minutes. During these operations the instrument continuously recorded paste viscosities. As a final test, the paste was stirred with a high-speed propeller type agitator (at about 5000 r.p.m.) for 10 minutes and then the paste viscosity was measured with the instrument.

Data showing paste viscosities, expressed in terms of Brabender units, at various stages of this test are presented below. Also shown below are percentage figures representing changes in paste viscosity during different stages of the test. In calculating these figures, the viscosity change ×100 was divided by the viscosity at the start of the test phase under examination.

| Chlorine Added (Percent of Starch Weight) | 1 0 | 0.075 | 0.29 | 0.35 | a 1.59 |
|---|---|---|---|---|---|
| Initial Viscosity at 95° C. | 415 | 480 | 475 | 435 | 320 |
| Viscosity after 60 Minutes at 95° C. | 260 | 415 | 405 | 360 | 245 |
| Viscosity after Cooling to 50° C. | 680 | +1,000 | 770 | 700 | 485 |
| Viscosity after 60 Minutes at 50° C. | 520 | +1,000 | 865 | 770 | 540 |
| Viscosity after 10 Minutes of High Speed Stirring | 190 | | 315 | 295 | 140 |
| Viscosity Decrease While at 95° C. (Percent) | 37 | | 15 | 17 | 23 |
| Viscosity Increase on Cooling to 50° C. (Percent) | 161 | | 90 | 94 | 98 |
| Viscosity Change on Holding at 50° C. (Percent) | −24 | | +12 | +11 | +11 |

[1] Control.
[a] In this test 40 g. of product per 500 ml. was used.

These data show that pastes of the oxidized products undergo smaller viscosity changes during the various test stages than pastes of the control sample. This example demonstrates that the paste viscosity of hydroxyethyl starch can be increased by a short treatment with small amounts of chlorine. Although high speed agitation caused a reduction in viscosity in all cases, note that after this severe shearing action pastes of the chlorine treated samples were considerably more viscous than that of the untreated product. This is important in applications where high rates of shear are produced when the starch paste is applied to the material being sized. For example, extremely high rates of shear prevail when starch paste is applied to paper using new types of high speed machinery.

Microscopic examinations of the treated pastes before and after the shearing action revealed that the initial pastes contained many swollen starch granules which did not disintegrate during normal pasting procedures. We have observed that when starch products are treated with amounts of chlorine in the range of about 0.03 to about 0.5 percent, based on the weight of starch, the resistance of these swollen starch granules to disintegration due to shear stress passes through a maximum.

I claim:
1. A process for producing a starch derivative which comprises hydroxyalkylating starch under non-gelatinizing conditions in aqueous slurry with lime as catalyst, adjusting the pH of the slurry to 2.0 and separating the resultant hydroxyalkyl starch therefrom, reslurrying the hydroxy-alkyl starch in water and adjusting the pH of the resulting slurry to at least 8.0 and oxidizing the hydroxyalkyl starch with an oxidizing agent which releases chlorine at an oxidation-reduction potential of at least 700 millivolts, maintaining a pH of at least 8.0 during the oxidation reaction and recovering the oxidized hydroxyalkyl starch.

2. Process according to claim 1 wherein during oxidation the pH is maintained at about 11 and the amount of free chlorine is in the range of about 0.03 to 0.5 percent, based on the weight of the hydroxyalkyl starch.

References Cited in the file of this patent

UNITED STATES PATENTS

| | | |
|---|---|---|
| 2,238,912 | McHard et al. | Apr. 22, 1941 |
| 2,606,188 | Yelland | Aug. 5, 1952 |
| 2,744,894 | Benedict et al. | May 8, 1956 |
| 2,801,241 | Hobbs | July 30, 1957 |

FOREIGN PATENTS

| | | |
|---|---|---|
| 741,742 | Great Britain | Dec. 14, 1955 |

OTHER REFERENCES

Journal of Chemical Education, vol. 14, Oct. 1937, pp. 460–463. Article entitled "On Starch," by R. S. Shane.

Manufacturing Chemist and Manufacturing Perfumer, July 1942, XIII, 7, pp. 158 to 161 and 166. Article entitled "The Oxidation of Starch," by J. A. Radley.

Pigman et al.: "Carbohydrate Chemistry," 1948, Academic Press Inc., pp. 580–581.